Figure 1:
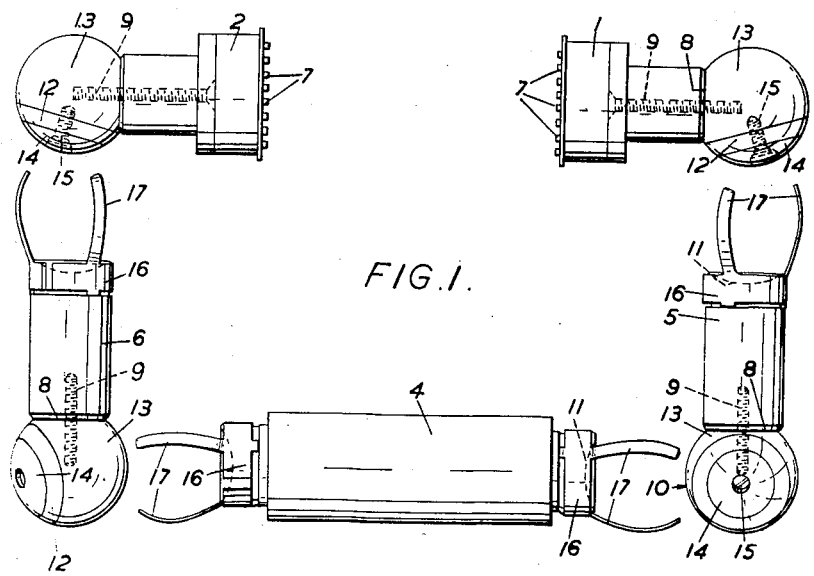

Sept. 25, 1956

R. I. MINCHOM 2,764,716

MAGNETIC APPARATUS

Filed Oct. 15, 1953

Inventor
RAPHAEL I. MINCHOM

By
Holcombe Wetherill & Burbow
Attorney

United States Patent Office 2,764,716
Patented Sept. 25, 1956

2,764,716

MAGNETIC APPARATUS

Raphael Isaac Minchom, Hendon, London, England

Application October 15, 1953, Serial No. 386,332

Claims priority, application Great Britain October 21, 1952

9 Claims. (Cl. 317—203)

This invention relates to magnetic apparatus of the kind including a magnet and a part or parts of magnetisable material constituting a path of relatively low magnetic reluctance for a magnetic circuit.

It is an object of the invention to provide an improved method of varying the reluctance of the magnetic circuit in such apparatus.

Thus according to the present invention magnetic apparatus of the kind referred to comprises a composite flux carrying element in the shape of a body of revolution or part thereof interposed between and in contact with two other flux carrying elements, at least one of which is formed with a cooperating curved surface capable of sliding over the surface of the body of revolution, the surface of the composite element being formed with a magnetisable portion and a relatively non-magnetisable portion such that by relative movement between the slidable surfaces the position of the non-magnetisable portion of the composite element with relation to the magnetic circuit, and so the reluctance of the circuit, may be varied.

The composite element is preferably formed with a non-magnetisable layer sandwiched between two magnetisable portions the width of the non-magnetisable layer being such that the cooperating curved surface is always in contact with one or other of the two magnetisable portions, and the non-magnetisable layer is preferably non-diametral to the body of revolution.

The composite element is moreover preferably spherical or part spherical in shape, and may thus constitute one element of a flexible joint of the ball and socket type.

In another aspect the invention relates to a modification of the invention described and claimed in my copending application Ser. No. 260,510, filed December 7, 1951, for Magnetic Apparatus, now Patent No. 2,722,636.

Thus it is a further object of the invention to provide an improved magnetic device suitable for example for use in crack detecting, which will include means for varying the magnetic reluctance of the device and thus the strength of the magnetic flux which is carried into the article to be magnetized and will be simple and economical to manufacture and easy to operate.

According to this aspect of the invention magnetic apparatus as claimed in any of the claims of copending patent application No. 260,510 includes a flexible flux-carrying joint comprising a spherical or part spherical composite element connected to one flux-carrying member and arranged to co-operate with a spherical or part spherical surface on another flux-carrying member, the spherical element comprising a magnetisable portion and a relatively non-magnetisable portion, whereby the magnetic reluctance of the apparatus may be varied by varying the relative position of the spherical element and the spherical surface with which it co-operates.

The non-magnetisable portion of the spherical element is preferably formed as a layer of sheet material interposed between two part spherical portions of magnetisable material.

In such case the external surface of the non-magnetisable portion of the spherical element is preferably of such size and shape that the cooperating spherical surface is always in contact with one or other of the magnetisable portions.

Moreover the layer of non-magnetisable material is preferably non-diametral to the sphere, and is preferably arranged at an angle to the axis of the flux carrying member to which the spherical element is connected.

Figure 2:
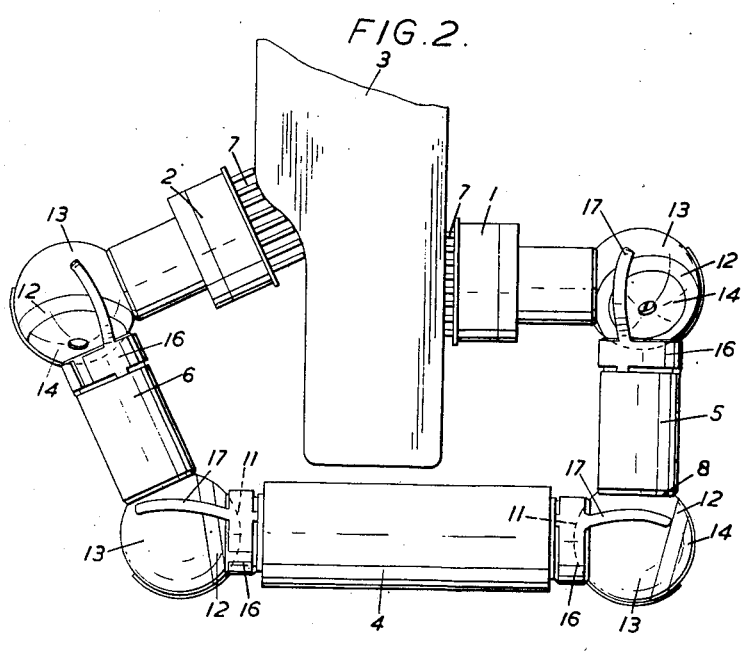

The invention may be carried into practice in various different ways but one specific embodiment will now be described by way of example, as applied to the particular form of magnetic apparatus described in copending application No. 260,510 and with reference to the accompanying drawings in which Figure 1 is an "exploded" view of the apparatus, and Figure 2 is a view of the assembled apparatus in position on an article which is to be tested for cracks.

The apparatus comprises basically two head assemblies 1 and 2 for carrying magnetic flux respectively to spaced points on the part or article 3 to be magnetized, a magnetic unit 4 which may include a permanent or an electromagnet, and two intermediate flux-carrying elements 5 and 6 which can be so assembled respectively between each head 1 and 2 and the adjacent end of the magnetic unit 4 as to form in effect a complete magnetic circuit when the apparatus is in use.

Each head 1 and 2 is provided with a number of spaced individually slidable contact elements 7, which permit the apparatus to be used effectively with surfaces of a wide variety of different curvature. Such contact elements are described and claimed in copending application No. 260,510.

Between each intermediate flux-carrying element 5 and 6 and the adjacent part 1, 2, or 4, is arranged a flexible flux-carrying ball and socket joint embodying the present invention. These joints may be identical to one another and for convenience therefore only one, namely that between one intermediate flux-carrying element 5 and the adjacent end of the magnetic unit 4, will now be described in detail. Corresponding parts of the other flexible joints are given the same reference numerals for convenience.

The intermediate flux-carrying element 5 is of cylindrical form with a plane end surface 8. Rigidly secured to this plane surface 8, as by means of a double-ended stud 9, is a spherical composite element 10 formed with a flat to engage this plane surface. The adjacent end of the magnetic unit 4 is also of cylindrical form and is provided with a smooth concave part-spherical end surface 11 to co-operate by sliding contact with the spherical composite element 10.

The spherical composite element 10 is formed mainly of magnetisable material such as mild steel but is provided with a non-magnetisable lamination or layer insert 12, preferably of aluminium, sandwiched between a larger 13 and a relatively smaller 14 magnetisable portion. The larger magnetisable portion 13 is secured to the intermediate flux-carrying element 5 (by means of the stud 9) while the three parts 14, 12 and 13 are secured together by means of a countersunk brass or other non-magnetic screw 15. The thickness of the lamination 12 is such that its external free surface can be bridged in any direction by the co-operating spherical surface 11 on the magnetic unit. Conveniently the plane of the lamination 12 is non-diametral to the sphere 10 and is arranged at an angle of about 15° to the axis of the intermediate flux-carrying element 5, for ease of production, and in order to provide the maximum degree of flexibility with a substantially unrestricted path when required, for magnetic flux through the joint (e. g. when positioned as shown at the lower right hand joint in Figure 2). The area of the spherical end surface 11 of the magnetic unit 4 is approximately the same as the external surface area of the smaller magnetisable portion 12 of the spherical element.

In operation it will be seen that the apparatus provides in each unit a flexible flux-carrying joint between each intermediate flux-carrying element 5 and 6 and the magnetic unit 4 and the head assemblies 1 and 2 and means for varying the magnetic reluctance of the circuit. Thus the magnetic unit 4 may be flexed to any position within mechanical limits relative to the intermediate flux-carrying element 5 with its spherical end surface 11 in contact always with the spherical element 10, and the reluctance of the magnetic circuit may be varied by altering the relative position of the non-magnetic lamination 12, which may be effected simply by rotating the intermediate flux-carrying element 5 about its axis. Thus when the spherical end surface 11 of the magnetic unit 4 registers with the smaller magnetisable portion 14 of the spherical element 10 the non-magnetisable lamination 12 interrupts the magnetic circuit, and thus the reluctance of the apparatus is increased and the flux is reduced. Progressive reductions of the reluctance may be obtained by moving the end surface 11 of the magnetic unit relative to the spherical element 10 so that progressively greater areas of the surface 11 are in contact with the larger magnetisable portion 13 of the spherical element.

Moreover since each of the four flexible joints provided in the present illustrated example is capable of similar adjustment, the range of variation in the magnetic flux transmitted by the apparatus is correspondingly increased. It will be seen that owing to the relative dimensions of the parts at least a part of the end surface 11 of the magnetic unit 4 will be in contact at all times with either the smaller 14 or larger 13 magnetisable portions of the spherical element and thus the two parts 4 and 5 of the joint will be held together by magnetic attraction even when the total flux is passing through the non-magnetisable lamination 12. Mechanical means may also be provided for retaining the two parts of the joint together when the magnetic flux decreases below a certain value, or for any other reason. These means conveniently comprise a collar 16 secured to the end of the magnetic unit 4 and formed with three resilient non magnetisable fingers 17 arranged partly to embrace the spherical element 10.

For ease of operation the external surfaces of the non-magnetisable laminations 12 in the spherical elements 10 are preferably coloured to distinguish them from the adjacent magnetisable surfaces. Thus in the present example where, to assist assembly, a red and black colour convention is used to represent north and south polarity, the opposite ends of the magnetic unit 4 and the two head assemblies 1 and 2 being coloured appropriately, the external surfaces of the non-magnetisable laminations 12 are anodised red or black, as appropriate.

What I claim as my invention and desire to secure by Letters Patent is:

1. Magnetic apparatus for introducing magnetic flux into an article, including a magnet and at least one other flux-carrying part of magnetisable material, and a composite flux carrying element in the shape of at least part of a body of revolution, interposed between and in contact with two separate, relatively movable flux carrying parts and rigidly secured to one of said parts, the other part being formed with a cooperating curved surface capable of sliding over the surface of the body of revolution to form a flexible joint therewith, the surface of the composite element being formed with a magnetisable portion and a relatively non-magnetisable portion, such that relative sliding movement between the slidable surfaces caused by relative movement between the two flux carrying parts varies the position of the non-magnetisable portion of the composite element with relation to the magnetic circuit, and so varies the reluctance of the circuit.

2. Magnetic apparatus as claimed in claim 1, in which the non-magnetisable portion of the composite element is in the form of a layer sandwiched between two magnetisable portions, the width or thickness of the non-magnetisable layer being such that the cooperating curved surface on one of said flux carrying parts is always in contact with one or other of the two magnetisable portions of the composite element.

3. Magnetic apparatus as claimed in claim 2 in which the non-magnetisable layer is non-diametral to the body of revolution.

4. Magnetic apparatus as claimed in claim 1 in which the composite element is at least partly spherical in shape and forms one member of a universal joint of the ball-and-socket type between the two relatively movable flux carrying parts.

5. Magnetic apparatus comprising at least three separate relatively movable flux carrying elements including a magnet, and two head assemblies for carrying magnetic flux into an article, and a flexible flux carrying joint between at least two of such flux carrying elements, said joint comprising a composite element which is at least partly spherical in shape, and which is secured to one flux carrying element, one other flux carrying element being formed with a cooperating curved surface to engage said composite element, the partly spherical part of said composite element comprising a magnetisable portion and a relatively non-magnetisable portion both conforming in curvature with said curved surface, such that variations in the relative position of the composite element and the curved surface with which it cooperates cause variations in the magnetic reluctance of the circuit.

6. Magnetic apparatus as claimed in claim 5, in which the non-magnetisable portion of the composite element is formed as a layer of sheet material interposed between two part-spherical portions of magnetisable material.

7. Magnetic apparatus as claimed in claim 6, in which the external surface of the non-magnetisable portion of the composite element is of such size and shape that the cooperating curved surface on the said flux carrying element is able to bridge the gap between the two magnetisable portions of the composite element.

8. Magnetic apparatus as claimed in claim 6, in which the layer of non-magnetisable material is non-diametral to the spherical composite element.

9. Magnetic apparatus as claimed in claim 8, in which the layer of non-magnetisable material is inclined to the axis of the flux carrying member to which the spherical element is connected.

References Cited in the file of this patent

UNITED STATES PATENTS

| 2,225,179 | Oglevee | Dec. 17, 1940 |
| 2,575,811 | Hofammann et al. | Nov. 20, 1951 |

FOREIGN PATENTS

| 775,082 | France | Oct. 1, 1934 |